United States Patent
Nakamura et al.

(10) Patent No.: US 7,587,738 B2
(45) Date of Patent: Sep. 8, 2009

(54) ADAPTER DEVICE FOR IMAGE CAPTURING DEVICE

(75) Inventors: Shintaro Nakamura, Saitama-ken (JP); Toshihiro Nakayama, Saitama-ken (JP)

(73) Assignee: Hoya Corporation, Tokyo (JP)

( * ) Notice: Subject to any disclaimer, the term of this patent is extended or adjusted under 35 U.S.C. 154(b) by 716 days.

(21) Appl. No.: 10/385,470

(22) Filed: Mar. 12, 2003

(65) Prior Publication Data

US 2003/0177500 A1 Sep. 18, 2003

(30) Foreign Application Priority Data

Mar. 13, 2002 (JP) .................... 2002-068434

(51) Int. Cl.
*H04N 7/173* (2006.01)

(52) U.S. Cl. ............. 725/105; 725/117; 725/147; 725/110; 725/118; 725/148; 725/151; 348/14.02; 348/14.01; 348/14.05

(58) Field of Classification Search ........ 725/105, 725/117, 147, 110, 118, 148, 151; 709/217, 709/203, 219; 348/14.02, 14.01, 14.05
See application file for complete search history.

(56) References Cited

U.S. PATENT DOCUMENTS

| 5,530,473 | A | | 6/1996 | Sakai et al. |
| 6,014,706 | A | * | 1/2000 | Cannon et al. .............. 709/231 |
| 6,038,257 | A | * | 3/2000 | Brusewitz et al. ......... 375/240.21 |
| 6,067,571 | A | * | 5/2000 | Igarashi et al. ............. 709/232 |
| 6,101,536 | A | * | 8/2000 | Kotani et al. ............... 709/217 |
| 6,256,060 | B1 | | 7/2001 | Wakui |
| 6,353,848 | B1 | * | 3/2002 | Morris ....................... 709/203 |
| 6,469,737 | B1 | | 10/2002 | Igarashi et al. |
| 6,897,891 | B2 | * | 5/2005 | Itsukaichi ................. 348/14.1 |

FOREIGN PATENT DOCUMENTS

| JP | 7-200971 | 8/1995 |
| JP | 10-40185 | 2/1998 |
| JP | 10-042185 A | 2/1998 |
| JP | 11-032240 A | 2/1999 |
| JP | 2001-57675 | 2/2001 |
| JP | 2003-060937 A | 2/2003 |

OTHER PUBLICATIONS

English language Abstract of JP 2003-060937 A.
English language Abstract of JP 10-042185 A.
English language Abstract of JP 11-032240 A.

* cited by examiner

*Primary Examiner*—Shawn An
(74) *Attorney, Agent, or Firm*—Greenblum & Bernstein, P.L.C.

(57) ABSTRACT

A network camera system is configured such that an adapter device is connected with a digital camera, and the adapter device is connected with a network to which a client is also connected. A video signal representing a real-time image and a digital image signal representing a high-resolution still image are transmitted from the camera to the adapter. The adapter has a function of a file server and allows the client to download image data corresponding to the high-resolution still image. The adapter device further has a function of a streaming server and transmits streaming data representing the real-time image. The client can transmits an operation command to the adapter through the network, and the adapter transfer the command to the camera to perform the operation required by the client.

10 Claims, 7 Drawing Sheets

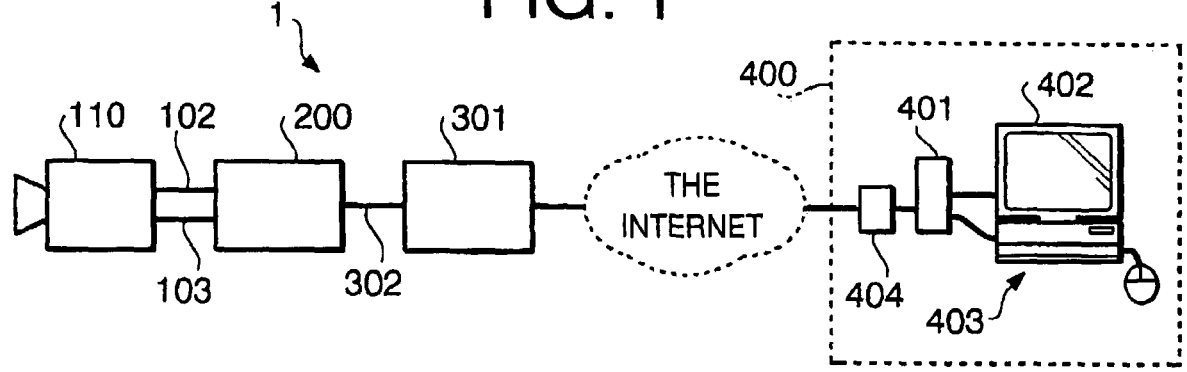
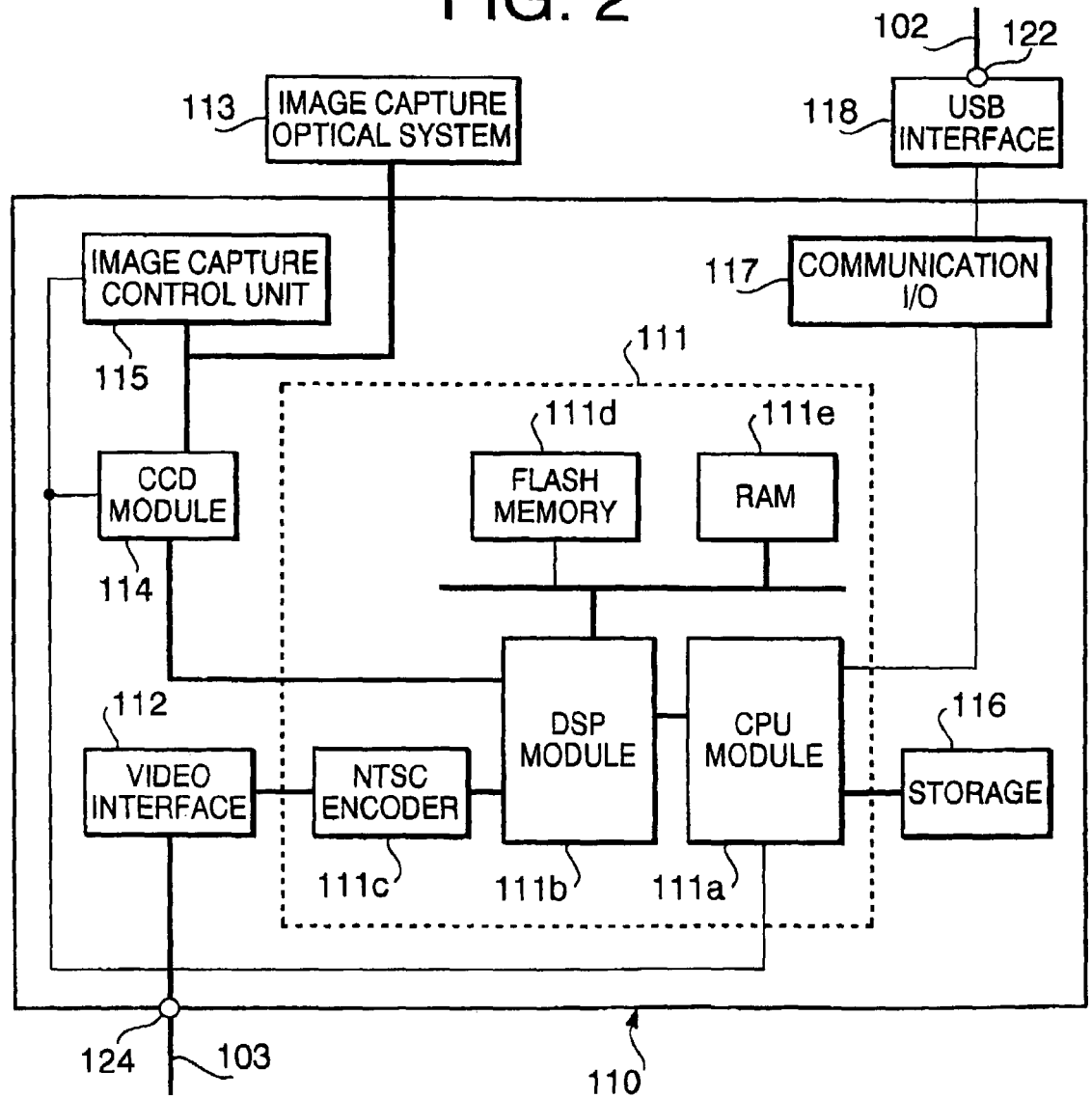

ADAPTER DEVICE FOR IMAGE CAPTURING DEVICE

BACKGROUND OF THE INVENTION

The present invention relates to an adapter device which is connected to image capturing devices such as video cameras and transmits captured images to image browsing terminals at distant places through a network such as the Internet.

Recently, the broadband Internet such as ADSL or CATV system has become available at a relatively low cost, and an Internet server such as HTTP server and/or FTP server can be used as a home-use server.

Besides the HTTP server and/or the FTP server, a streaming server which transmits a real-time video image captured by a video camera or the like is now available. The streaming server is expected to be used for home security systems. Therefore, such a personal streaming server may be widespread as the broadband becomes popular.

In the meantime, recently, a digital camera provided with a CCD having several millions of image pixels has been developed and used. If such a digital camera and the streaming server are used in combination, an inexpensive network camera system having a high performance may be expected.

However, the size of the data output by such a digital camera may be approximately 1 Mega bytes even if the data is compressed. In order to transmit such data, even if the broadband transmission line is used, one through several seconds may be required to transmit one image. Depending on a condition of the communication line, more transmission time may be required. Therefore, even if such a digital camera is used to configure the network camera system, it is difficult to use the digital camera to transmit the high-resolution real-time image to a distant place.

SUMMARY OF THE INVENTION

The present invention is advantageous in that an adapter device is provided, with which an image captured by an imaging device such as a digital camera can be transmitted through a network to another computer connected to the network.

According to an aspect of the invention there is provided a network camera system including at least one client, a digital camera and an adapter device, the client and the adapter being connected with each other through a network.

In such a system, the camera is provided with an image capturing device, an analog video signal outputting system that outputs an analog video signal representing a moving image captured by the image capturing device, a digital image signal outputting system that outputs a digital image signal representing a still image captured by the image capturing device, a control command receiving system, and an operation control system that controls an operation of the camera in accordance with the control command received through the control command receiving system.

Further, the adapter device is provided with a file server system that receives the digital image signal from the camera and stores an image file representing the still image captured by the image capturing device, the file server system allowing the at least one client to download the image file from the file server through the network, a streaming server system that receives the analog video signal from the camera and creates streaming data corresponding to the received video signal, the streaming data being transmitted to the client through the network, a command receiving system that receives an operation command from the client through the network, and a command transmitting system that transmits a control command corresponding to the operation command to the camera.

Furthermore, the client is provided with a browsing system that downloads the image file from the file server system and displays an image represented by the image file, the browsing system being capable of processing the streaming data and displaying the moving image represented by the streaming data, and a command transmitting system that allows an operator to input an operation command indicative of an operation to be executed by the camera and transmits the operation command to the adapter device through the network.

As above, according to one aspect, the network camera system is configured such that an adapter device is connected with a digital camera, and the adapter device is connected with a network to which a client is also connected. A video signal representing a real-time image and a digital image signal representing a high-resolution still image are transmitted from the camera to the adapter. The adapter has a function of a file server and allows the client to download image data corresponding to the high-resolution still image. The adapter device further has a function of a streaming server and transmits streaming data representing the real-time image. The client can transmits an operation command to the adapter through the network, and the adapter transfer the command to the camera to perform the operation required by the client.

Optionally, the operation to be executed by the camera may include capturing a still image when the operation command is input to the command transmitting system by the operator.

Further optionally, the digital image signal may represent the captured image output by the digital image signal outputting system is received by the file server system and stored in the adapter device.

In a particular case, the operation to be executed by the camera may include at least one of zooming operation of the camera, capturing a still image and adjustment of brightness of an image captured by the camera.

Still optionally, a resolution of the still image may be greater than that of the moving image.

According to another aspect of the invention, there is provided an adapter device for a network camera system. The network camera system may include at least one client, a digital camera and the adapter device, and the client and the adapter device are connected with each other through a network. The camera is capable of outputting an analog video signal representing a moving image and digital image signal representing a still image captured by the camera, an operation of the camera being controllable by inputting a control command to the camera. The client may include a browsing system that downloads the image file from a file server system and displays an image represented by the image file, the browsing system being capable of processing streaming data and displaying a moving image represented by the streaming data. The client may further include a command transmitting system that allows an operator to input an operation command indicative of an operation to be executed by the camera and transmits the operation command to the adapter device through the network. In such a network, the adapter device is provide with a file server system that receives the digital image signal from the camera and stores an image file representing the still image captured by the camera, the file server system allowing the at least one client to download the image file through the network, and a streaming server system that receives the analog video signal from the camera and creates streaming data corresponding to the received video signal, the streaming data being transmitted to the client through the network. The adapter device is further provided with a command receiving system that receives an operation command from the client through the network, and a command transmitting system that transmits a control command corresponding to the operation command to the camera.

According to a further aspect of the invention, there is provided an adapter device capable of being connected with an image capturing device and transmitting a captured image to a terminal connected to a network system as digital image data. The adapter device is provided with a first interface receiving an analog signal output by the image capturing device, a second interface capable of transmitting/receiving digital data to/from the image capturing device, a first image data generating system that generates first digital data based on the analog signal received through the first interface, a network interface that exchanges data with the terminal through the network, and a controller that controls the first interface, the second interface, the first image data generating system and the network interface.

Optionally, the analog signal may be an analog video signal.

Further optionally, the network may include the Internet.

Still optionally, the adapter device may be configured to transmit data to the terminal in accordance with the HTTP.

Further optionally, the adapter device may further include a casing. The first interface and the second interface may be formed on the casing, and the adapter device may be configured such that, by securing the casing onto the image capturing device, an analog signal output terminal of the image capturing device is connected to the first interface and a digital signal output terminal of the image capturing device is connected to the second interface.

With such a configuration, no cables are necessary for connecting the camera and the adapter, and handling thereof can be facilitated.

In a particular case, the adapter includes a fixation mechanism that securely fixes the adapter device to the image capturing device.

Optionally, the fixation mechanism may include a positioning member that is used to adjust a positional relationship of the adapter device with respect to the image capturing device when the adapter is secured to the image capturing device.

Further optionally, the positioning member may include at least two guide pins which are inserted in corresponding holes formed on the image capturing device.

Optionally, the fixation mechanism may include locking claws which engage with engageable portions formed on the image capturing device.

In this case, the fixation mechanism may further include a release mechanism which is operated to release engagement of the locking claws with the engageable portions.

According to another aspect of the invention, there is provided an adapter device to be connected with an image capturing device. The adapter is provided with a first terminal and a second terminal which are connectable with the image capturing device, a third terminal connectable to a communication network, a controlling system capable of controlling the image capturing device, an image processing system that processes an image signal to generate first digital image data, and a server system that manages digital image data including the first digital image data.

With this structure, the first terminal receives a video signal of a moving image, the image processing system generating the first digital image data by processing the video signal. A control signal instructing the image capturing device to capture second digital image data representing an image having a higher resolution than an image represented by the first digital image data is transmitted from the controlling system through the second terminal. The second digital image signal, which is generated in response to the control signal transmitted to the image capturing device through the second terminal, is received through the second terminal. Further, another control signal requesting for capturing of the second digital image data by the image capturing device is transmitted from a computer connected to the communication network to the controlling system through the third terminal. The server system transmits one of the first digital image data and the second digital image data to the computer through the third terminal.

BRIEF DESCRIPTION OF THE ACCOMPANYING DRAWINGS

FIG. 1 shows an entire configuration of a network camera system according to a first embodiment;

FIG. 2 is a block diagram of a digital camera of the network camera system;

DESCRIPTION OF THE EMBODIMENT

Figure 3:
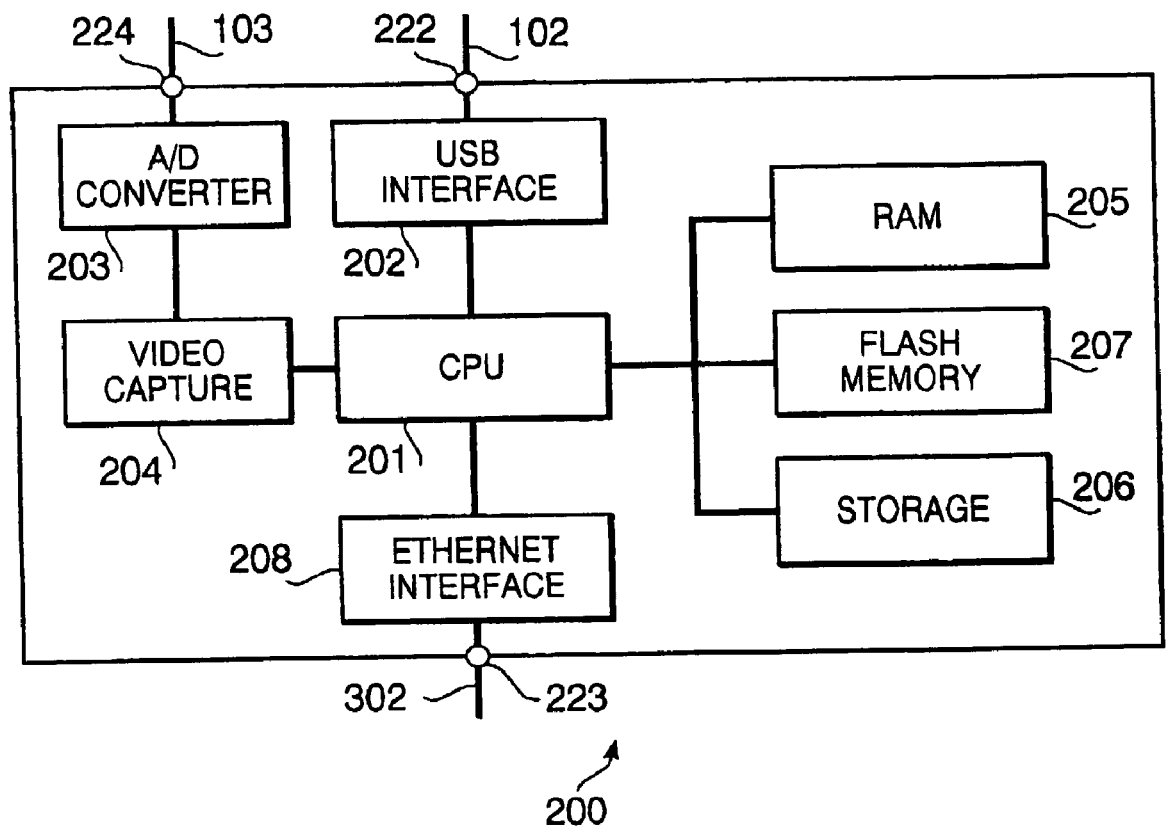
FIG. 3 is a block diagram of an adapter device of the network camera system.

Hereinafter, an embodiment of the invention will be described with reference to the accompanying drawings.

FIG. 1 schematically shows an entire configuration of a network camera system according to a first embodiment of the invention. The network camera system 1 includes a digital camera 110, an adapter device 200, an ADSL modem 301 and a client PC 400.

The digital camera 110 is capable of capturing a high-resolution digital still image, a maximum size of which is 3200×2400 (pixels). Further, the digital camera 110 has a video output function, and is capable of outputting a video signal output by the CCD of the digital camera 110 as an NTSC signal. The digital camera 110 also has a USB (Universal Serial Bus) interface as a communication interface to communicate with an external device.

The digital camera 110 is connected with the adapter device 200 through a USB (Universal Serial Bus) cable 102 and a video cable 103. The adapter device 200 receives the NTSC signal representing an moving image through the video cable 103, and the high-resolution digital still image through the USB cable 102, from the digital camera 110. Further, the adapter device 200 is capable of controlling the digital camera 110 by sending control commands through the USB cable 102.

The adapter device 200 has both the USB interface and the Ethernet (trademark) interface, which will be described later. The adapter device 200 is connected to the Internet through a router type ADSL modem 301 and an Ethernet cable 302. The adapter device 200 has a file server function, and capable of storing the high-resolution digital still images received from the digital camera 110 in a storage unit thereof as high-resolution digital still image files, and allows the thus stored image files to be downloaded by another computer connected to the Internet.

The adapter device 200 is capable of encoding each frame of the analog moving images into a low-resolution (e.g., VGA size: 640×480) digital image data. Further, the adapter device 200 has a streaming server function, and is capable of transmitting the encoded low-resolution digital image data to another computer connected to the Internet. It should be noted that the adapter device 200 according to the first embodiment is capable of encoding and transmitting the image on a substantially real-time basis. Accordingly, another computer connected to the Internet is capable of communicating at a sufficient communication speed, the low-resolution digital image data captured by the digital camera 110 and encoded by the adapter device 200 can be browsed as a real-time moving image.

The client PC 400 has a main body 401, a monitor 402, an input device 403 including the keyboard, mouse and the like, and the ADSL modem 404.

The client PC 400 can be connected to the Internet through the ADSL modem 404, and receive the low-resolution digital image data encoded by the adapter device 200. By subsequently display the images thus received, the images captured by the digital camera 110 can be displayed on the monitor 402 as a moving image substantially simultaneously with the capturing thereof. Further, the client PC 400 is capable of downloading the high-resolution digital still image data stored in the storage unit of the adaptor device 200, and displaying the image represented by the downloaded data.

FIG. 2 shows a block diagram of the digital camera 110 according to the first embodiment. The digital camera 110 includes a controller 111, a video interface 112, an image capture optical system 113, a CCD (Charge Coupled Device) module 114, an image capture control unit 115, a storage 116, a communication I/O (input/output module) 117, a USB (Universal Serial Bus) interface 118, a video output terminal 124 and a USB socket 122.

The light beam incident on the image capture optical system 113 is converged on the light receiving surface of the CCD module 114. The CCD module 114 converts the received optical image into electrical signals at every 1/30 seconds and transmits the thus generated electric signals to the controller 111.

The controller 111 includes a CPU module 111a, a DSP (Digital Signal Processor) module 111b, an NTSC encoder 111c, a flash memory 111d and an ASIC (Application-Specific Integrated Circuit) including a RAM 111e. Operation of the digital camera 110 is controlled as the CPU module 111a executes a program stored in the flash memory 111d.

The image signal output by the CCD module 114 is transmitted to the DSP module 111b. The DSP module 111b applies predetermined signal processing such as digital conversion, gamma compensation and white balance adjustment. When a still image is required, the DSP module 111b reads out the image data all the pixels in the effective imaging area of the CCD and generates high-resolution digital image data representing an image consisting of 3200×2400 pixels. Otherwise, the DSP module 111b controls the CCD module 114 to obtain a low-resolution image by thinning the number of pixels or by applying addition to adjoining pixels or the like to reduce the number of pixels of an image to a VGA size (i.e., 640×480 pixels). The size-reduced (i.e., low-resolution) image data is transmitted to the NTSC encoder 111c. The data is converted into the NTSC video signal and is transmitted to the video interface 112. The image conversion procedure by the DSP module 111b and the NTSC encoder 111c is executed within less than 1/30 seconds per one image frame. Therefore, the image captured by the image capture optical system 113 is output through the video interface 112 as an analog video signal.

The USB cable 102 is connected with the USB interface 118 through a USB socket 122. The USB interface 118 is connected with a communication I/O 117. Further, the communication I/O 117 is connected with the CPU module 111a, which controls the communication I/O 117 and transmits/receives the digital data to/from the adapter device 200 through the USB cable 102. The adapter device 200 transmits a control signal to the CPU module 111a through the USB cable 102 to control that digital camera 110. For example, when a predetermined control signal is transmitted from the adapter device 200 to the digital camera 110, the CPU module 111a of the digital camera 110 captures a high-resolution still image and transmits the same to the adapter device 200. For another example, when another predetermined signal is transmitted from the adapter device 200 to the digital camera 110, the CPU module 111a controls the image capture control unit 115 to perform a zooming operation and/or an adjustment of the aperture size.

When the image capture start signal is input to the digital camera 110 by the adapter device 200, the CPU module 111a obtains a high-resolution digital image converted by the DSP module 111b, and encodes the data into a high-resolution image data file in JPEG format, and stores the JEPG file in the storage 116. Further, the CPU module 111a transmits the high-resolution image data file to the adapter device 200 through the USB cable 102. For the above operations, the RAM 111e is used to provide a work area.

FIG. 3 is a block diagram of the adapter device 200. The adapter device 200 includes a CPU 201, a USB interface 202, an A/D converter 203, a video capture 204, a RAM 205, a storage 206, a flash memory 207, an Ethernet socket 223 to which the Ethernet cable 302 is connected, an Ethernet interface 208, a USB socket 222 to which the USB cable 102 is connected, and a video input terminal 224 to which the video cable 103 Is connected.

The USB interface 202 is connected with the CPU 201, which transmits a control signal to the digital camera 110 through the USB cable 102 connected with the USB socket 222. Further, the CPU 201 obtains the high-resolution image data file from the digital camera 110 through the USB cable 102, and stores the received image data file in the storage 206.

The video signal output by the video output terminal 124 of the digital: camera 110 is received by the A/D converter 203 of the adapter device 200 through the video cable 103. The A/D converter 203 digitizes the video signal and transmits the digitized video signal to the video capture 204. The video capture 204 processes the digitized video signal and generates image data representing a low-resolution (i.e., 640×480 pixels) image. The above process is performed within a period of 1/30 seconds.

The Ethernet interface 208 is connected with the ADSL modem 301. The CPU 201 executes an HTTP server program so that other computers connected to the Internet can download the image data files stored in the storage 206.

According to the embodiment, only a predetermined client PC 400 is allowed to access the storage 206. For example, an operator of the client PC 400 transmits predetermined ID and password to the adapter device 200 by operating the input device 403. Then, the adapter device 200 performs authentication with reference to the input ID and password. Only to the client PC 400 which is authenticated, the image data files stored in the storage 206 are transmitted.

The above procedure is performed as the CPU 201 executes corresponding programs stored in the flash memory 207. Therefore, by rewriting the programs stored in the flash memory 207, it becomes possible to use another digital camera, which has the USB interface and the analog video signal output, to function in the similar way. Accordingly, the system configuration can be changed depending on purposes. It should be noted that the RAM 205 is used as a work area when the CPU 201 executes such programs.

Figure 4:
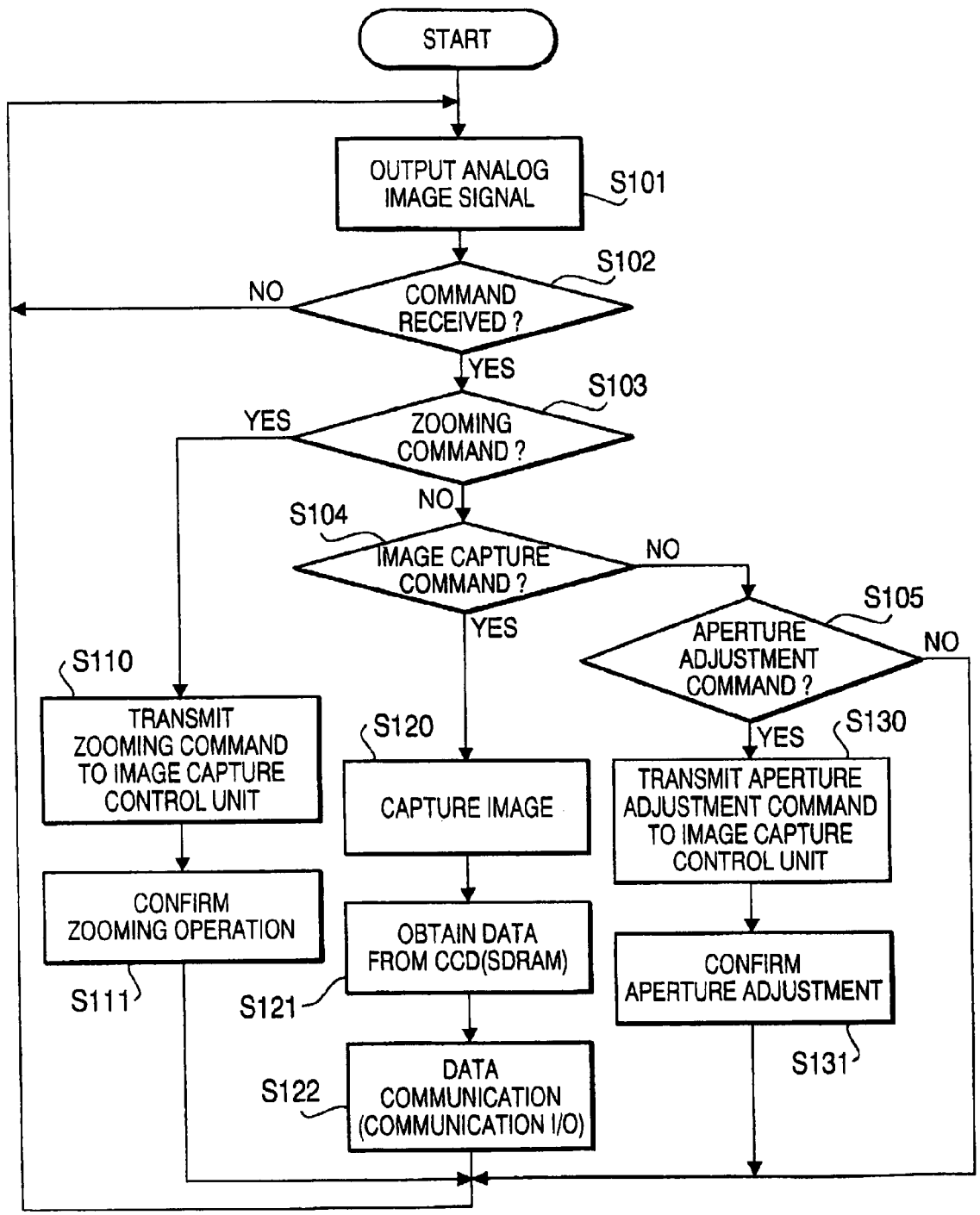
FIG. 4 is a flowchart illustrating an operation of the digital camera shown in FIG. 2.

FIG. 4 is a flowchart illustrating an operation of the digital camera 110 according to the embodiment.

When the program is initiated, in S101, the CPU module 111*a* controls the DSP module 111*b* so that the signal corresponding to 1 frame of image output by the CCD module 114 is converted into the NTSC video signal, which is output from the video interface 112. Then, control proceeds to S102.

In S102, the CPU module 111*a* checks a status of the communication I/O 117 to examine whether the control command has been received from the adapter device 200. If the control commands has been received from the adapter device 200 (S102: YES), control proceeds to S103. If the control command has not been received (S102: NO), control returns to S101.

From S103 to S105, a procedure to be executed is determined in accordance with an instruction represented by the control command transmitted from the adapter device 200.

In S103, it is judged whether the control command indicates a zooming of the camera. If the control command indicates the zooming operation (S103: YES), control proceeds to S110. If the control command does not indicate the zooming (S103: NO), control proceeds to S104.

In S104, it is judged whether the control command indicates a capturing of a still image. If the control command indicates the capturing of a still image (S104: YES), control proceeds to S120. If the control command does not indicates the capturing of the still image (S104: NO), control proceeds to S105.

In S105, it is judged whether the control command indicates adjustment of an aperture size. If the control command indicates the adjustment of the aperture size (S105: YES), control proceeds to S130. If the control command does not indicates the adjustment of the aperture size (S105: NO), control returns to S101.

In the flowchart shown in FIG. 4, one of the three procedures described above is performed. However, it is an exemplary embodiment, and in an actual configuration, more than three procedures may be included and selection may be made therefrom.

In S110, the CPU module 111*a* transmits a zoom command to the image capture control unit 115. The image capture control unit 115 controls, upon receipt of the zoom command, the image capture optical system 113 to execute zooming operation. Then, control proceeds to S111.

The image capture control unit 115 transmits a predetermined end signal to the CPU module 111*a* when the zooming operation is finished. In S111, the CPU module 111*a* receives the end signal indicative of the completion of the zooming operation and confirms the completion of the zooming operation. Then, control proceeds to S101.

In S120, the CPU module 111*a* instructs the DSP module 111*b* to capture an image. Then, control goes to S121.

In S121, the DSP module 111*b* extracts the output signal of the CCD module 114, converts the same to generate image data, and transmits the image data to the CPU module 111*a*. The CPU module 111*a* generates an image data file representative of the high-resolution image compressed in JPEG format using the converted image data, and stores the image data file in the storage 116. Then, control proceeds to S122.

In S122, the CPU module 111*a* controls the communication I/O 117 to transmit the image data file stored in the storage 116 to the adapter device 200 through the USB cable 102. Then, control proceeds to S101.

In S130, the CPU module 111*a* transmits an aperture size adjustment command to the image capture control unit 115. The image capture control unit 115 controls, upon receipt of the aperture size adjustment command, the image capture optical system 113 to adjust the aperture size. Then, control proceeds to S131.

The image capture control unit 115 transmits a predetermined end signal to the CPU module 111*a* when the above-described aperture size adjustment operation is terminated. In S131, the CPU module 111*a* receives the end signal and recognizes the completion of the aperture size adjustment and confirms the completion of the aperture size adjustment operation. Then, control proceeds to S101.

According to the above-described procedures, the digital camera 110 performs capturing of a still image, aperture adjustment, zooming operation and the like in accordance with control signal transmitted from the adapter device 200.

Figure 5:
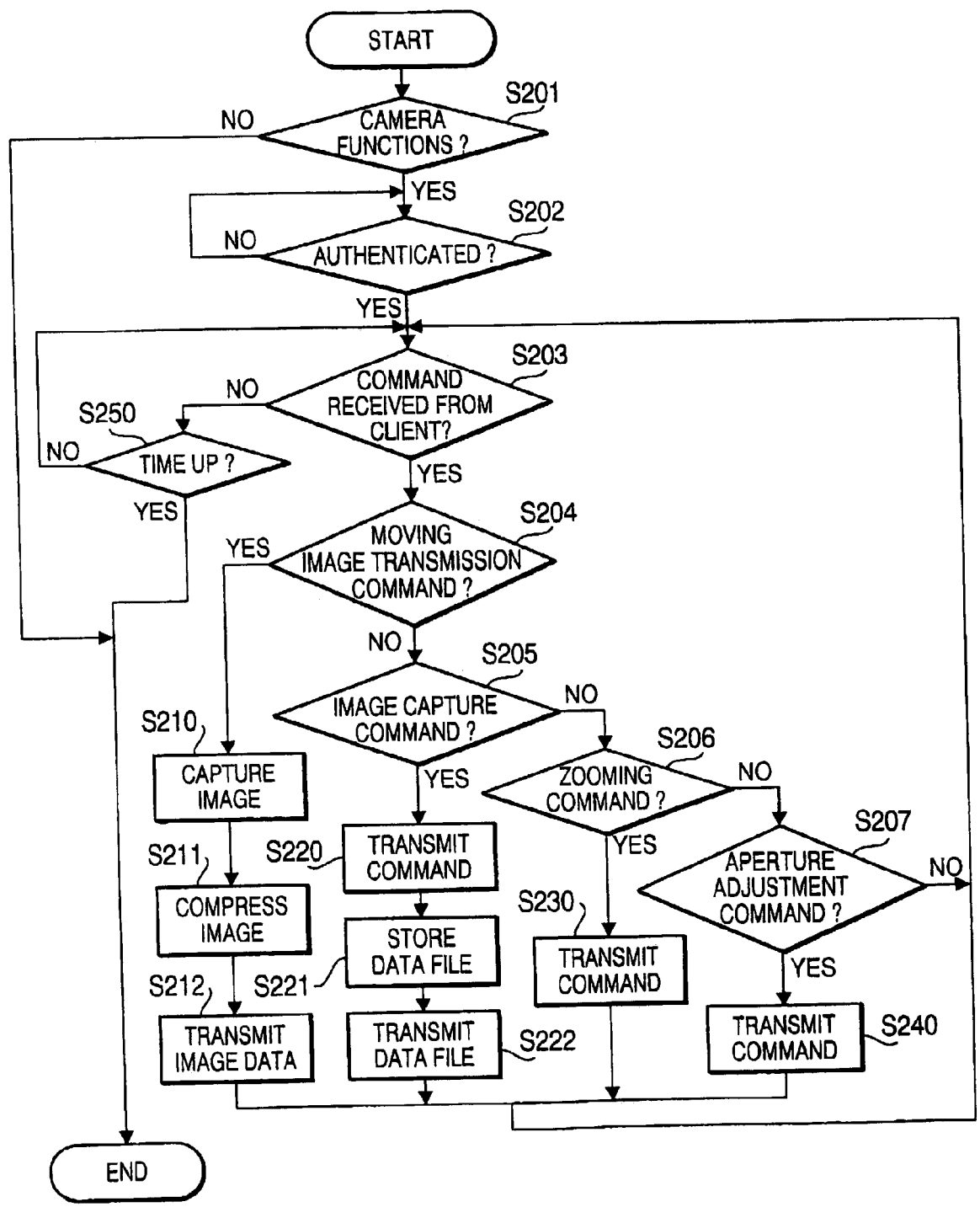
FIG. 5 is a flowchart illustrating an operation of the adapter device.

FIG. 5 is a flowchart illustrating an operation of the adapter device 200.

In S201, the adapter device 200 transmits a predetermined signal to the digital camera 110 through the USB cable 102, and checks a response of the digital camera 110 with respect to the transmitted predetermined signal. That is, the CPU 201 judges whether the digital camera 110 operates correctly based on the response of the digital camera 110.

If it is judged that the digital camera 110 operates correctly (S201: YES), control proceeds to S202. If it is judged that the digital camera 110 does not operate correctly (e.g., when the digital camera 110 is not powered ON) (S201: NO), the procedure shown in FIG. 5 is terminated.

In S202, authentication is performed. That is, control pauses until predetermined ID and password are transmitted from the client PC 400. When the predetermined ID and password are transmitted (S202: YES), control proceeds to S203. Until the predetermined ID and password are transmitted (S202: NO), control repeats S202.

In S203, the CPU 201 judges whether a command is transmitted from the client PC 400. If the CPU 201 has not received the command from the client PC 400 (S203: NO), control proceeds to S250. In S250, it is judged whether a predetermined period (e.g., 30 seconds) has elapsed. That is, by repeating S203 and S250, it is judged whether a status in which the CPU 201 does not receive the command from the client PC 400 is kept for the predetermined period.

According to the present embodiment, when the client PC 400 is used for browsing the image captured by the digital camera 110 through the adapter device 200, the client PC 400 transmits a request for one frame of moving image at every $1/30$ seconds. According to the embodiments, the client PC 400 receives the thus transmitted still images constituting the moving image, which are subsequently reproduced and displayed in the client PC 400. Therefore, if no signal has been received from the client PC 400 for the predetermined period, an operator of the client PC 400 may operate the client PC 400 so as to stop browsing the images, or the connection between the client PC 400 and the adapter device 200 may have been lost. Therefore, in such a case, i.e., the command has not been transmitted from the client PC 400 to the adapter device 200 for the predetermined period (S250: YES), the procedure shown in FIG. 5 is terminated. Otherwise (S250: NO), control returns to S203.

In S204 through S207, a procedure to be executed is determined depending on an instruction represented by the received command.

In S204, it is judged whether the command indicates "transmission of one frame of moving image". If it does (S204: YES), control proceeds to S210. Otherwise (S204: NO), control proceeds to S205.

In S205, it is judged whether the command indicates "capturing of a high-resolution still image". If it does (S205: YES), control proceeds to S220. Otherwise (S205: NO), control proceeds to S206.

In S206, it is judged whether the command indicates the "zooming operation". If it does (S206: YES), control proceeds to S230. Otherwise (S206: NO), control proceeds to S207.

In S207, it is judged whether the command indicates "adjustment of the aperture size". If it does (S207: YES), control proceeds to S240. Otherwise (S207: NO), control returns to S203.

In S210, the CPU 201 controls the video capture 204 to convert the one frame of video signal, which is being transmitted from the digital camera through the video cable 103, to digital image data representing a low-resolution image. Then, control proceeds to S211.

In S211, the digital image data generated in S210 is compressed to create an image data file for animation, which is stored in the storage 206. Then, control proceeds to S212.

In S212, the image data file for animation, which is created in S211, is transmitted to the client PC 400. Then, control returns to S203.

Specifically, according to the embodiment, the moving image is realized by subsequently displaying the low-resolution images, which are represented by, but not limited to, JPEG (Joint Photographic Experts Group) files. In S210 and S211, the a frame of the video signal is converted to a JPEG file. Through the video cable 103, frames, each of which as a VGA (Video Graphic Array)size (i.e., 640×480 pixels), are subsequently transmitted at a rate of 30 frames/second. Each frame data is converted/compressed into a JEPG file to generate image data files of animations which are subsequently stored in the storage 206. A predetermined number of thus generated JPEG files are stored, and the newest file replaces the oldest file in the storage.

When the client PC 400 transmits a request for one frame of the moving image, the CPU 201 transmits the latest JPEG file when the request is received to the client PC 400. As will be described with reference to FIG. 8, the request of the client PC 400 and the transmission of the new JPEG file in response to the request are continuously repeated, thereby the user of the PC 400 can view the moving image.

It should be noted that, depending of the traffic, the file transmission rate may be less than 30 fps (files per second). However, since the timing when the adapter 200 receives the request from the client PC 400 cannot be scheduled in advance, all the frames (i.e., 30 frames per second) are stored in the storage 206.

It should be noted that, in the above example, the low-resolution image is represented by JPEG files of VGA images, and the JPEG files are transmitted at a rate of 30 fps. However, this configuration may be modified depending on usage/communication environments. For example, a smaller image (e.g., QVGA: 320×240 pixels) may be used, transmission rate may be reduced (e.g., 15 fps) and/or a compression rate may be increased to reduce the amount of data transmitted to the client PC 400.

In S220, the CPU 201 controls the USB interface 202 to transmit an operation command instructing capturing of a still image to the digital camera 110. The digital camera 110 captures a high-resolution still image (e.g. 3200×2400 pixels) and transmits an image data file containing the high-resolution still image to the adapter device 200 (S122 of FIG. 4) when the command transmitted from the USB interface 202 is received (S120 of FIG. 4). Thereafter, control proceeds to S221.

In S221, the CPU 201 stores the image data file transmitted from the digital camera 110 (S122 of FIG. 4) in the storage 206. Then, control proceeds to S222.

In S222, the image data file stored in the storage 206 in S221 is transmitted to the client PC 400. Then, control proceeds to S203.

In S230, the CPU 201 controls the USB interface 202 to transmit an operation command instructing the zooming operation to the digital camera 110. Upon receipt of the command (S103 of FIG. 4: YES), the digital camera 110 controls the image capture control unit 115 to perform the zooming operation (S110 of FIG. 4). Then, control returns to S203.

In S240, the CPU 201 controls the USB interface 202 to transmit an operation command instructing the adjustment of the aperture to the digital camera 110. Upon receipt of the command (S105 of FIG. 4: YES), the digital camera 110 controls the image capture control unit 115 to adjust the aperture size (S130 of FIG. 4). Then, control returns to S203.

As described above, as the adapter device 200 operates in accordance with the control signal transmitted from the client PC 400, various operations including transmission of moving/still images and control of the camera functions.

The above-described and other commands transmitted from the client PC 400 to the adapter device 200 are issued as an operator of the client PC 400 operates application programs running on the client PC 400.

Figure 6:
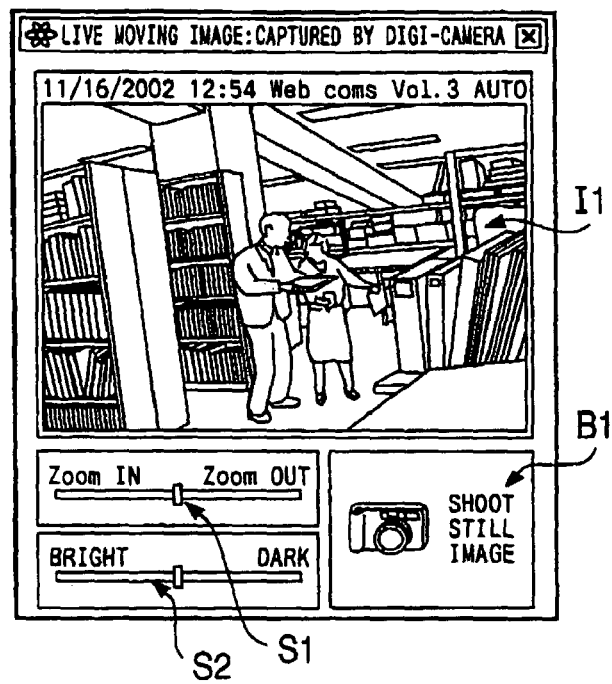
FIG. 6 is an exemplary screen shot when an "Image Browsing/Camera Controlling Program" is executed in a client PC.
Figure 7:
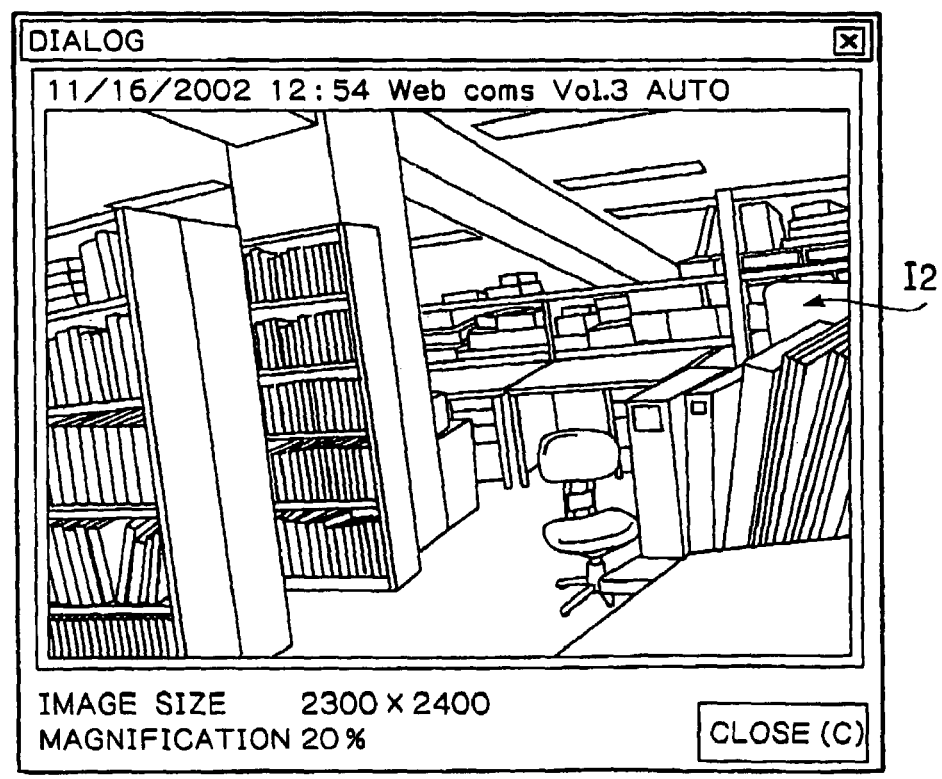
FIG. 7 is an exemplary screen shot when an "Image Browsing/Camera Controlling Program" is executed in a client PC.

FIGS. 6 and 7 show examples of screen images on the client PC 400 when an application program runs.

FIG. 6 shows a main window of the screen when an "image browsing/camera controlling program" is executed in the client PC 400. The main window includes a low-resolution moving image display area I1, a still image capture button B1, a zooming slider S1 and an aperture size slider S2 are arranged.

In the moving image display area I1, images transmitted from the adapter device 200 (S212 of FIG. 5) are displayed subsequently. Thus, the low-resolution image is updated at every 1/30 second, thereby a moving image displayed on the moving image display area I1.

If the operator of the client PC 400 operates the input device 403 to click the button B1, the command instructing the "capture of the high-resolution still image" is transmitted from the client PC 400 to the adapter device 200. The zoom slider S1 and the aperture size slider S2 indicate current status of zooming condition and the aperture size, respectively. Further, if the operator of the client PC 400 operates the input device 403 to move the zoom slider S1 and the aperture size slider S2, the commands instructing the "zooming operation" and the "adjustment of the aperture size" are transmitted from the client PC 400 to the adapter device 200, respectively.

Specifically, if the operator clicks the button B1, a still image display window as shown in FIG. 7 is displayed on the monitor 402. In the still image display window, a still image display area I2 is arranged. The image of the image file transmitted from the adapter device 200 (S222 of FIG. 5) is displayed in the still image display area I2.

Thus, in a typical case, the operator observes the moving image displayed on the moving image display area I1, and adjust the zooming condition and the brightness (i.e., the aperture size). Then, when the operator clicks the button B1, a high-resolution image corresponding to the image displayed in the moving image display area I1 is captured and transmitted from the digital camera 110 via the adapter device 200.

Figure 8:
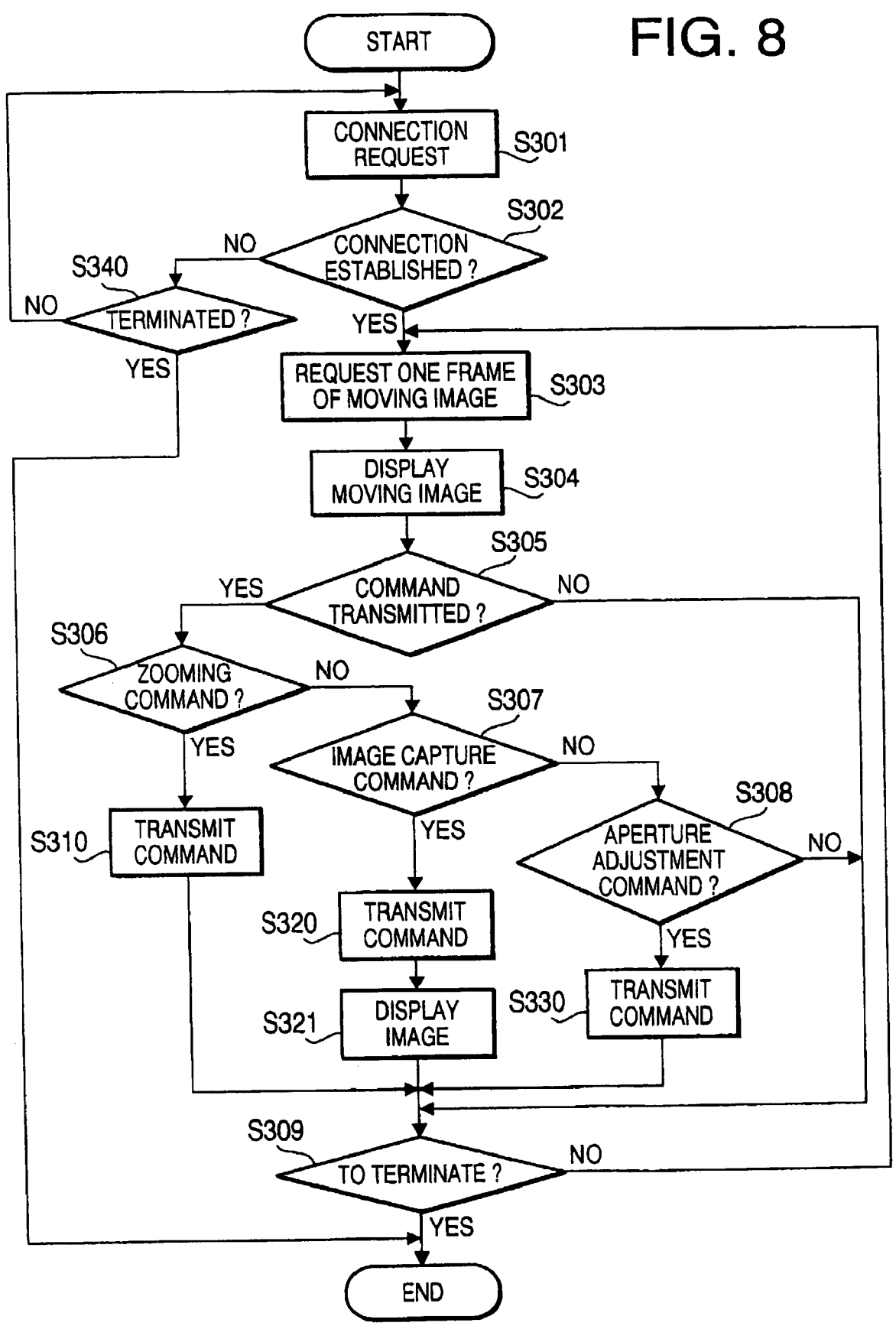
FIG. 8 is a flowchart illustrating an operation of the client PC.

FIG. 8 shows a flowchart illustrating the procedure of the image browsing/camera controlling program executed in the client PC 400. In S301, the client PC 400 accesses the adapter device 200 through the Internet, and transmits the predetermined ID and password assigned to the client PC 400 to the adapter device 200.

In S302, it is judged whether the client PC 400 is connected to the adapter device 200 and is successfully authenticated (cf. S202 of FIG. 5: YES). If a code indicating "successfully authenticated" is received from the adapter device 200 (S302: YES), control proceeds to S303. If the adapter device 200 does not respond for a predetermined period (e.g., 30 seconds) as the adapter device 200 has not operated, has failed to authenticate or the like, control proceeds to S340.

In S340, a message indicating the operator that the connection is not established is displayed, and the operator is asked to re-execute the procedure for establishing the connection with the adapter device 200. Then, the operator operates the input device 403 to input the instruction indicating to re-execute or terminate the procedure.

If the operator instructs the re-execution (S340: NO), control returns to S301. If the operator instructs to terminate the procedure (S340: YES), the procedure shown in FIG. 8 is terminated.

In S303, the client PC 400 transmits a command requesting for transmission of a frame of moving image to the adapter device 200. Then, control proceeds to S304. Upon receipt of this command (S204 of FIG. 5: YES), the adapter device 200 transmits the image data representing a frame of moving image to the client PC 400 (S212 of FIG. 5).

In S304, the client PC 400 displays the image data, which has been transmitted from the adapter device 200 in S212 of FIG. 5, in the moving image display area I1 (see FIG. 6). Then, control proceeds to S305.

In S305, it is judged whether a command is input by the operator of the client PC 400. If the command is input (S305: YES), control proceeds to S306. If the command is not input (S305: NO), control proceeds to S309.

In S306 through S308, a procedure to be performed is determined depending on the command input by the operator.

In S306, it is judged whether the input command indicates the "zooming". If the input command indicates the "zooming" operation (S306: YES), control proceeds to S310. If the command is not the "zooming" command (S306: NO), control proceeds to S307.

In S307, it is judged whether the input command indicates the "capturing of high-resolution still image". If the input command indicates the capturing of the image (S307: YES), control proceeds to S320. Otherwise (S307: NO), control proceeds to S308.

In S308, it is judged whether the input command indicates the "adjustment of the aperture size". If the input command indicates the adjustment of the aperture size (S308: YES), control proceeds to S330. If not (S308: NO), control proceeds to S309.

In S310, the client PC 400 transmits a command instructing the zooming operation to the adapter device 200 through the Internet. Upon receipt of the command (S206 of FIG. 5: YES), the adapter device 200 transmits a command instructing the zooming operation to the digital camera 110 (S230 of FIG. 5). Then, control proceeds to S309.

In S320, the client PC 400 transmits a command instructing to capture a still image to the adapter device 200 through the Internet. Then, upon receipt of this command (S205 of FIG. 5: YES), the adapter device 200 transmits the high-resolution image data file to the client PC 400 (S222 of FIG. 5). Then, control proceeds to S321.

In S321, the still image display window (FIG. 7) is opened, and the image represented by the image data file transmitted from the adapter device 200 is displayed in the still image display area I2. Thereafter, control proceeds to S309.

In S330, the client PC 400 transmits a command instructing to adjust the aperture size to the adapter device 200 through the Internet. Then, upon receipt of this command (S207 of FIG. 5: YES), the adapter device 200 transmits a command to perform the adjustment of the aperture size to the client PC 400 (S240 of FIG. 5). Then, control proceeds to S309.

With the above configuration, the operator of the client PC 400 can monitor the moving image simultaneously with the capturing thereof, and obtain the high-resolution still image at a desired timing.

In the above-described embodiment, the digital camera 110 and the adapter device 200 are connected using the video cable 103 and the USB cable 102 so that the digital camera 110 and the adapter device 200 can be arranged freely. However, the invention is not limited to this configuration, and the adapter device may be detachably coupled with the digital camera without using the cables. Such a configuration will be described hereinafter as a second embodiment.

Figure 9:
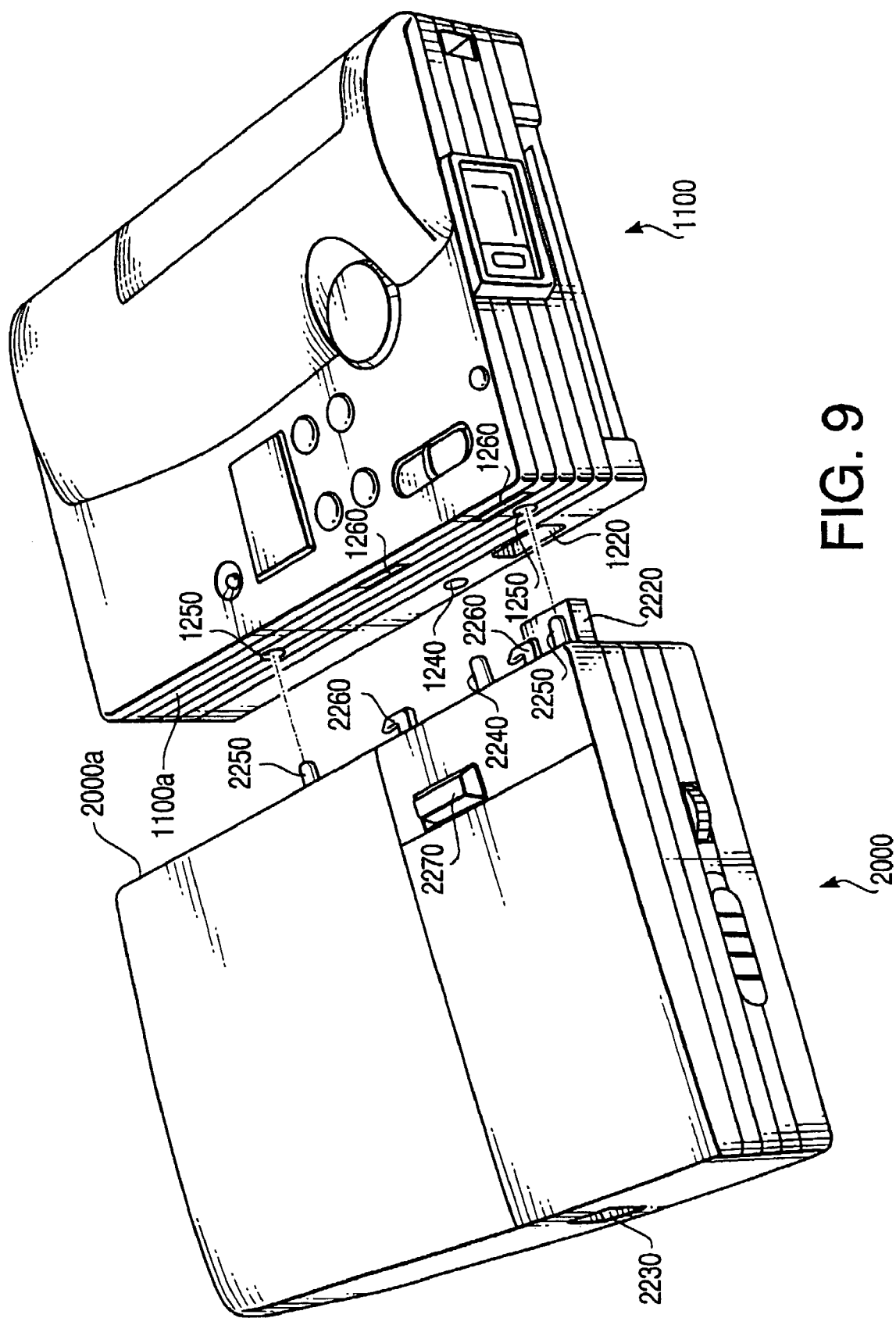
FIG. 9 is a perspective view of a digital camera and an adapter device according to a second embodiment.

FIG. 9 is a perspective view of a digital camera 1100 and an adapter device 2000 according to a second embodiment.

On a side wall 1100a of the digital camera 1100, a video output socket 1240, a USB socket 1220, guide holes 1250 and lock claw inserting holes 1260 are formed. On a side wall 2000a of the adapter device 2000, facing the side wall 1100a of the digital camera 1100, guide pins 2250, locking claws 2260, a video input plug 2240 and a USB plug 2220 are provided. The locking claws 2260 are L-shaped hooking members, which are formed on a single plate member (not shown) accommodated in a body of the adapter device 2000. The single plate member is slidable in a longitudinal direction of the side wall 2000a and biased with a spring (not shown) such that, when adapter device 2000 is coupled to the digital camera 1100, the locking claws are inserted through the locking claw insertion holes 1260 and engaged with the side wall 1100a. The adapter device 2000 is further provided with a lock release button 2270 on the top surface thereof.

It should be noted that the USB socket 1220, the video output socket 1240, the USP plug 2220, the Ethernet interface socket 2230, the video input plug 2240 correspond to the USB socket 122, the video output terminal 124, the USB socket 222, the Ethernet socket 223 and the video input terminal 224 of the network camera system 1 according to the first embodiment.

When the lock release button 2270 is depressed, the locking claws 2260 are moved in a direction opposite to the biased direction so that the engagement of the locking claws 2260 with the side wall 1100a is released.

The guide pins 2250 are protruded from the side wall 2000a. The guide pins 2250 are received by the guide holes 1250 formed on the side wall 1100a of the digital camera 1100, thereby the positional relationship between the digital camera 1100 and the adapter device 2000 is restricted. On a side wall 2000b, which is opposite to the side wall 2000a of the adapter device 2000, an Ethernet interface socket 2230 is provided.

When the adapter device 2000 is coupled to the digital camera 1100, the guide pins 2250 are inserted in the guide holes 1250. Then, the locking claws 2260, video input plug 2240, USB plug 2220 face the locking claw insertion holes 1260, video output socket 1240 and the USB socket 1220, respectively. As the locking claws 2260 engage with the side wall 1100a as described above, the terminals are electrically connected, and the adapter device 2000 are firmly coupled to the digital camera 1100. As described above, by depressing the lock release button 2270, the adapter device 2000 can easily be detached from the digital camera 1100.

As described above, by depressing the lock release button 2270, the engagement of the locking claws 2260 with the insertion holes 1260 is released, and the adapter device 2000 can be detached from the digital camera 1100.

According to the configuration of the second embodiment, the adapter device 2000 can be coupled to and detached from the digital camera 1100 easily. Further, since no cables are required when the adapter device 2000 is coupled to the digital camera 1100, the entire system can be made compact.

As described above, according to the invention, the functions of the digital camera can be used efficiently. Regarding the monitor image (moving image), for which the response is important, the image generated by the digital camera is efficiently used. Regarding the functions requiring interactivity with respect to the camera, such as operation control or transmission of high-resolution images, by making use of the USB interface, which is provided in the digital camera, transmission of control commands and/or high-resolution image data can be executed.

Accordingly, the adapter device is only required to have additional functions which are not provided in the digital camera and are necessary to configure the network camera system described above. Since commercial digital camera may be provided with the functions described above, an inexpensive network camera system can be configured relatively easily.

The present disclosure relates to the subject matter contained in Japanese Patent Application No. 2002-068434, filed on Mar. 13, 2002, which is expressly incorporated herein by reference in its entirety.

What is claimed is:

1. An adapter device capable of being connected with an image capturing device, the image capturing device being capable of capturing a moving image and generating an analog video signal representing the moving image and of capturing a still image in response to a capturing command and generating digital image data representing the captured still image, the image capturing device being capable of outputting the analog video signal and the still image data to a network, said adapter device comprising:

a first interface configured to receive the analog video signal from the image capturing device;

a second interface, distinct from said first interface and configured to transmit the capturing command to the image capturing device and to receive the digital image data from the image capturing device;

a digital video-data generating system configured to generate digital video data based on the analog video signal received through said first interface;

a network interface configured to exchange data with a terminal through the network, the digital video data and the digital image data being transmitted to the terminal through said network interface; and a command receiver configured to receive the recording command and the capturing command from the terminal through said network interface, wherein, in response to receipt of the recording command by said command receiver, said first interface receives the analog video signal from the image capturing device for transmission to the terminal through said network interface, and wherein, in response to receipt of the capturing command by said command receiver, said second interface transmits the capturing command to the image capturing device and receives the digital image data from the image capturing device for transmission to the terminal through said network interface.

2. The adapter device according to claim 1, wherein said adaptor device is configured for use with a network camera system including at least one client and the image capturing device the adapter device configured for connecting with the client through the network, the client including a browsing system that downloads an image file from a file server system and displays an image represented by the image file, the browsing system being capable of processing streaming data and displaying a moving image represented by the streaming data, the client further including a command transmitting system that allows an operator to input an operation command indicative of an operation to be executed by the image capturing device and that transmits the operation command to said adapter device through the network, the image capturing device comprising a camera, said adapter device further comprising:

a file server system that receives the digital image data from the camera through said second interface and stores the image file representing the still image captured by the camera, said file server system allowing the at least one client to download the image file through said network interface;

a streaming server system that receives the analog video signal from the camera through said first interface and creates streaming data corresponding to the received video signal, the streaming data being transmitted to the client through said network interface;

a command receiving system that includes the command receiver and that receives an operation command from the client through said network interface; and a command transmitting system that transmits a control command corresponding to the operation command to the camera through said second interface.

3. The adapter device according to claim 1, wherein the network includes the Internet.

4. The adapter device according to claim 1, wherein said adapter device transmits data to the terminal in accordance with the HTTP.

5. The adapter device according to claim 1, further comprising a casing, wherein said first interface and said second interface are provided on said casing, wherein said adapter device is configured such that, by securing said casing onto the image capturing device, an analog signal output terminal of the image capturing device is connected to said first interface and a digital signal output terminal of the image capturing device is connected to said second interface.

6. The adapter device according to claim 5, further comprising a fixation mechanism that securely fixes said adapter device to the image capturing device.

7. The adapter device according to claim 6, wherein said fixation mechanism includes locking claws which are configured to engage with engageable portions provided on the image capturing device.

8. The adapter device according to claim 7, wherein said fixation mechanism further includes a release mechanism which is operated to release engagement of said locking claws with the engageable portions.

9. An adapter device capable of being connected with an image capturing device which is capable of capturing a moving image and generating an analog video signal representing the moving image and which is capable of capturing a still image in response to a capturing command input thereto and generating digital image data representing the captured still image, the image capturing device being capable of outputting the analog video signal and the still image data, said adapter device comprising:

a first interface configured to receive the analog video signal output by the image capturing device;

a second interface, distinct from said first interface and configured to receive digital data from the image capturing device, said second interface being configured for transmitting the capturing command to the image capturing device;

a digital video-data generating system configured to generate digital video data based on the analog signal received through said first interface;

a network interface configured to exchange data with a terminal through the network, the digital video data and the digital image data being transmitted to the terminal through said network interface;

a casing, wherein said first interface and said second interface are provided on said casing, wherein said adapter device is configured such that, by securing said casing onto the image capturing device, an analog signal output terminal of the image capturing device is connected to said first interface and a digital signal output terminal of the image capturing device is connected to said second interface; and a fixation mechanism that securely fixes said adapter device to the image capturing device, wherein, in response to receipt of a predetermined operation command from the terminal through said network interface, said second interface transmits the capturing command to the image capturing device and receives the digital image data output by the image capturing device, and wherein said fixation mechanism includes a positioning member configured to define a positional relationship of said adapter device with respect to the image capturing device when said adapter is fixed to the image capturing device.

10. The adapter device according to claim 9, wherein said positioning member includes at least two guide pins which are configured to be inserted in corresponding holes provided on the image capturing device.

* * * * *